United States Patent
Yoshikawa et al.

(10) Patent No.: US 6,443,870 B1
(45) Date of Patent: Sep. 3, 2002

(54) TOROIDAL-TYPE CONTINUOUSLY VARIABLE TRANSMISSION

(75) Inventors: Tomonobu Yoshikawa; Yasuo Murakami, both of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/659,581

(22) Filed: Sep. 11, 2000

(30) Foreign Application Priority Data

Sep. 14, 1999 (JP) ............................................ 11-260452

(51) Int. Cl.$^7$ ........................... F16H 15/38; F16C 33/00
(52) U.S. Cl. ........................... 476/40; 148/316; 384/912; 476/73
(58) Field of Search ..................... 476/40, 73; 384/492, 384/912, 913; 148/316

(56) References Cited

U.S. PATENT DOCUMENTS

| | | | |
|---|---|---|---|
| 4,904,094 A | * | 2/1990 | Furumura et al. ........... 384/492 |
| 5,030,017 A | * | 7/1991 | Murakami et al. ........... 384/492 |
| 5,077,003 A | * | 12/1991 | Muraoka et al. ............ 420/104 |
| 5,256,213 A | | 10/1993 | Narai et al. .................. 148/320 |
| 5,556,348 A | | 9/1996 | Kokubu et al. ................ 476/40 |
| 5,855,531 A | | 1/1999 | Mitamura et al. ............. 476/46 |
| 6,165,100 A | | 12/2000 | Mitamura et al. ............. 476/72 |

FOREIGN PATENT DOCUMENTS

JP 9-79337 * 3/1997

OTHER PUBLICATIONS

T. Abe, et al, Metal Fatigue—Influences of Micro–defects and Inclusions, "EP Steel (A Superlong–Life, High Reliability Bearing Steel)", Motion & Control NSK Techinical Journal, No. 652 (1992), pp. 1–8.

* cited by examiner

Primary Examiner—Allan D. Herrmann
(74) Attorney, Agent, or Firm—Sughrue Mion, PLLC

(57) ABSTRACT

The present toroidal-type continuously variable transmission comprises input and output disks coaxially disposed so as to be opposed to each other, and a pair of power roller bearings, each power roller bearing including an inner race, an outer race, and power rollers disposed so as to roll on the toroidal surfaces of the input and output disks. At least one of the input and output disks and power rollers are made of medium-carbon steel containing carbon in an amount ranging from 0.3 wt %–0.5 wt %, to thereby have a very long life.

4 Claims, 6 Drawing Sheets

TOROIDAL-TYPE CONTINUOUSLY VARIABLE TRANSMISSION

BACKGROUND OF THE INVENTION

The present invention relates to a toroidal-type continuously variable transmission and, in particular, to an improvement in a toroidal-type continuously variable transmission for use in vehicles such as automobiles.

As a conventional toroidal-type continuously variable transmission, there is known such a toroidal-type continuously variable transmission which is shown in FIG. 1.

In FIG. 1, reference characters 1 and 2 respectively designate an input disk and an output disk which are coaxially disposed so as to be opposed to each other within a housing (not shown). An input shaft 3 is penetrated through the axial portion of the toroidal-type continuously variable transmission in which the input and output disks 1 and 2 are disposed. In one end of the input shaft 3, there is disposed a loading cam 4. And, the loading cam 4 transmits the motive power (rotational force) of the input shaft 3 to the input disk 1 through a cam roller 5.

The input and output disks 1 and 2 have substantially the same shape and disposed symmetric; and, the mutually opposing surfaces of the input and output disks 1 and 2 are formed in toroidal surfaces which cooperate together in forming a substantially semicircular shape when they are viewed from the axial-direction cross sections thereof. And, in a toroidal cavity which is defined by the toroidal surfaces of the input and output disks 1 and 2, there are disposed a pair of power roller bearings 6 and 7 for power transmission in such a manner that they are in contact with the input and output disks 1 and 2.

Here, the power roller bearing 6 comprises a power roller 6a (which corresponds to an inner race forming part of the power roller bearing 6) which is disposed so as to roll on the toroidal surfaces of the input and output disks 1 and 2, an outer race 6b and a plurality of rolling bodies (steel balls) 6c. On the other hand, the power roller bearing 7 comprises a power roller 7a (which corresponds to an inner race forming part of the power roller bearing 7) which is disposed so as to roll on the toroidal surfaces of the input and output disks 1 and 2, an outer race 7b and a plurality of rolling bodies (steel balls) 7c.

That is, the power roller 6a serves also as an inner race which is a component of the power roller bearing 6, while the power roller 7a serves also as an inner race which is a component of the power roller bearing 7.

In this structure, the power roller 6a is pivotally mounted on a trunnion 10 through a pivot shaft 8, the outer race 6b and the plurality of rolling bodies 6c, and it is also supported in such a manner that it can be incliningly rotated about a pivot shaft O which provides the center of the toroidal surfaces of the input and output disks 1 and 2. On the other hand, the power roller 7a is pivotally mounted on a trunnion 11 through a pivot shaft 9, the outer race 7b and the plurality of rolling bodies 7c, and it is also supported in such a manner that it can be incliningly rotated about a pivot shaft O which provides the center of the toroidal surfaces of the input and output disks 1 and 2.

And, to the contact surfaces between the input and output disks 1, 2 and the power rollers 6a, 7a, there is supplied lubricating oil which has large viscous friction resistance; and thus the motive power input to the input disk 1 can be transmitted to the output disk 2 through films of the lubricating oil and power rollers 6a and 7a.

By the way, the input and output disks 1 and 2 are formed to be independent of the input shaft 3 (that is, they are not directly affected by the motive power input to the input shaft 3, namely, a rotary shaft) due to interposition of needles 12. In the output disk 2, there is disposed an output shaft 14 which is arranged in parallel to the input shaft 3 and is also rotatably supported on a housing (not shown) through angular bearings 13.

In the toroidal-type continuously variable transmission 20, the motive power of the input shaft 3 is transmitted to the loading cam 4. And, when the loading cam 4 is rotated due to the transmission of the motive power, the rotational power of the loading cam 4 is transmitted to the input disk 1 through the cam roller 5, thereby rotating the input disk 1. Further, the rotational power of the input disk 1 is transmitted to the output disk 2 through the power rollers 6a and 7a. In response to this, the output shaft 14 is rotated integrally with the output disk 2. To change the speed of a vehicle, the trunnions 10 and 11 may be moved by a slight distance in the direction of the pivot shaft 0.

That is, in case where the trunnions 10 and 11 are moved in the axial direction, the intersection between the rotating shaft of the power rollers 6a, 7a and the axis of the input and output disks 2 is caused to shift by a slight amount. This loses equilibrium between the rotational peripheral speed of the power rollers 6a, 7a and the rotational peripheral speed of the input disk 1 and also, due to a component of the rotational drive power of the input disk 1, the power rollers 6a and 7a are incliningly rotated around the pivot shaft O.

Thus, the power rollers 6a and 7a rotate incliningly on the curved surfaces of the input and out disks 2, whereby the speed ratio is changed, that is, the vehicle can be decelerated or accelerated. As a toroidal-type continuously variable transmission which includes the above-mentioned structure, conventionally, there is known a toroidal-type continuously variable transmission which is disclosed in JP-B-2-49411. Also, as the input and output disks as well as power roller bearings of the above-described type, conventionally, there are known disks and power roller bearings which, as set forth in [NASA Technical note NASA ATN-8362], use AISI52100 (which corresponds to JISSUJ2, high-carbon chromium bearing steel).

However, in the above-mentioned conventional toroidal-type continuously variable transmission, when driven, between the input disk 1 and its associated power roller bearing as well as between the output disk 2 and its associated power roller bearing, there are applied a high contact pressure as well as a high bending stress. In case where such contact pressure and bending stress are applied to the disks or power rollers, in the disks and power rollers, with non-metallic inclusions existing in the interior portions thereof as crack start points, cracks can be produced and developed, with the result that the disks and power rollers can be damaged or broken.

SUMMARY OF THE INVENTION

Thus, the present invention aims at eliminating the drawbacks found in the above-mentioned conventional toroidal-type continuously variable transmission.

Accordingly, it is an object of the invention to provide a toroidal-type continuously variable transmission, in which it is possible to enhance the fatigue or breakage lives of the power roller bearings and in turn greatly extend the life of the toroidal-type continuously variable transmission.

In attaining the object, according to the invention, there is provided a toroidal-type continuously variable transmission, comprising:

an input disk and an output disk disposed coaxially so as to be opposed to each other; and, a pair of power roller bearings, each power roller bearing including an inner race, an outer race and a plurality of rolling elements disposed so as to roll on the toroidal surfaces of the input and output disks, wherein at least one of the input disk, the output disk, the inner race and the outer race is made of medium-carbon steel containing carbon in an amount ranging from 0.3 wt % to 0.5 wt %.

In the above-mentioned toroidal-type continuously variable transmission according to the present invention, it is advantageous that the at least one of the input disk, the output disk, the inner race and the outer race has a surface layer which is carburized or carbonitrided.

In addition, in the above-mentioned toroidal-type continuously variable transmission according to the present invention, it is preferable that the at least one of the input disk, the output disk, the inner race and the outer race has a surface layer which is carburized or carbonitrided and are further hardened and tempered in such a manner that its resultant core portion hardness can be HRC 35 or higher.

Further, in the above-mentioned toroidal-type continuously variable transmission according to the present invention,: it is advantageous that assumed maximum non-metallic inclusion diameters of the medium-carbon steel in an area of 3000000 $mm^2$ is at 40 $\mu$m or less, wherein the assumed maximum inclusion diameters are determined by an extreme statistical method which is carried out by checking 30 pieces of its samples while using a microscope, measuring the maximum inclusions in an area of 100 $mm^2$ in each samples, and finding the assumed inclusion diameters in an area of 3000000 $mm^2$ through the measurement of a total area of 3000 $mm^2$.

Furthermore, in the toroidal-type continuously variable transmission according to the present invention, it is preferable that the medium-carbon steel is selected from the group consisting of SCM 415, SCM 420, SCM 430, SCM 435, SCM 440, SCM 445, and a modified version of SCM 445 with its carbon content increased up to 0.6%.

DETAILED DESCRIPTION OF THE PREFERRED EMBODIMENTS

Figure 1:
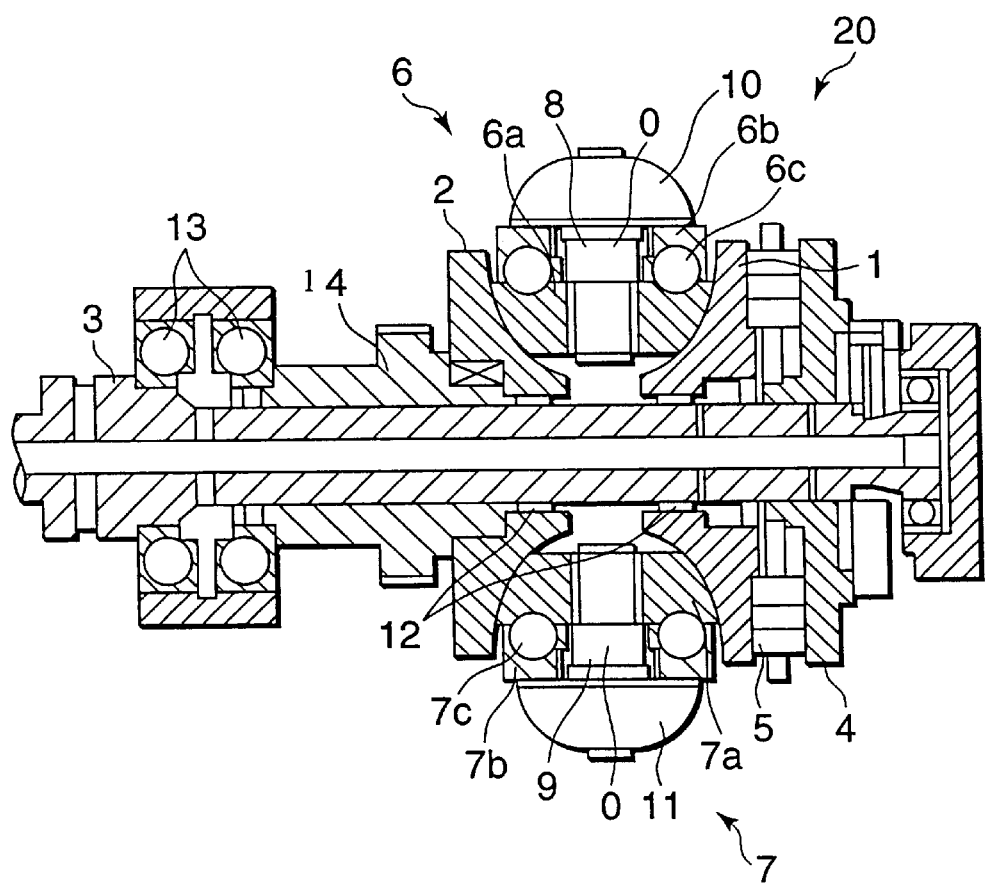
FIG. 1 is an explanatory view of a conventional toroidal-type continuously variable transmission.

Now, description will be given below in more detail of a toroidal-type continuously variable transmission according to the invention.

As in toroidal-type continuously variable transmission, in a structure where a rolling stress and a bending stress can be applied to the components thereof at the same, there is a case where there can be produced cracks, with non-metallic inclusions existing in the stress-applied portions of the structure components as the crack start points, and the structure components can be thereby broken finally. In this case, the sizes and quantities of the inclusions that provide the crack-start points have a great influence on the fatigue or breakage strength of the structure components. That is, it is widely known that the larger in size and quantity the inclusions are, the more greatly the fatigue strength is degraded.

Conventionally, various studies have found that, among the non-metallic inclusions, an oxide-system non-metallic inclusion gives rise to the production of the cracks.

In some steel manufacturers, there have been carried out for long years tests of reduction of non-metallic inclusions which are impurities contained in steel. For example, in [bearing steel] set forth in "Sanyo Special Steel Technique Vol. 5, 1997", there is shown the relation between the contents of oxygen in steel and the rolling life of the steel; and, the relation shows that, in case where the oxygen content in steel is reduced, the steel rolling life is enhanced. Also, in [the history of development of the steel manufacturing techniques in our company] set forth in "Sanyo Special Steel Technique Vol. 4, 1997", there is disclosed the progress of reduction in the oxygen content in steel from 1965 to 1990; and, from this disclosure, it can be found that, as the result of reduction in the oxygen content in steel obtained by this steel manufacturer, the rolling life of the steel has been enhanced.

Also, in [EP steel (extra long life/high reliability bearing steel)] set forth in NSK Technical Journal No. 652, 1992, attention is directed to the size and distribution of non-metallic inclusions contained in steel; and, this points out that, even when the oxygen contents in steel are the same, by controlling the size and distribution of non-metallic inclusions in steel when manufacturing the steel in such a manner that the inclusion size and distribution can be made small, the rolling life and rotation bending fatigue strength of the steel can be enhanced.

Reduction in the oxygen content in steel has been attained by introduction of a new steel manufacturing technique so far. A basic reaction for reducing the oxygen content in steel is a chemical reaction between carbon and oxygen. The greater the carbon content becomes, the more often the carbon reacts with the oxygen in steel. In case where this relation is used, the oxygen in steel can be removed. That is, the more the carbon content in material or steel is lowered, the more the oxygen content in steel is increased.

The present inventors have found that, in case where the carbon content in steel is equal to or more than 0.3 wt %, the distribution of oxide-system non-metallic inclusions contained in material is reduced and also the diameter of the maximum inclusion in steel to be assumed according to an extreme statistical method is reduced. Also, at the same time, a fatigue crack progress speed determines a speed at which a crack produced progresses and reaches the breakage of steel. The present inventors have also found that, in case where the carbon content in steel exceeds 0.5%, the crack progress speed is increased greatly. From these facts, by using medium-carbon steel with a carbon content in the range of 0.3%–0.5%, there can be obtained a toroidal-type continuously variable transmission which has a long life.

Further, the present inventors have found that, in case where the material hardness of the steel portion susceptible to stresses is enhanced, the fatigue strength of the steel can be enhanced.

In [Metal fatigue—Influences of Micro-defects and Inclusions], written by Takanobu Murakami and published in 1993 by Yoken-do Co., Mr. Murakami teaches that there are found the following relations between fatigue limits and inclusion diameters, material Vickers hardnesses. [Evaluation equation on fatigue limits with respect to micro-defects, cracks and inclusions in surface]

$$\sigma w = 1.43 \ (Hv+120)/\{(area)^{1/2}\}^{1/6}$$

[Evaluation equation on fatigue limits with respect to micro-defects, cracks and inclusions contactable in the inside]

$$\sigma w = 1.41 \ (Hv+120)/\{(area)^{1/2}\}^{1/6}$$

[Evaluation equation on fatigue limits with respect to micro-defects, cracks and inclusions contactable in the inside]

$$\sigma w = 1.56 \ (Hv+120)/\{(area)^{1/2}\}^{1/6}$$

However, in the above equations, w expresses fatigue limit (MPa), Hv expresses material hardness (kgf/mm$^2$), and (area)$^{1/2}$} expresses projection area ($\mu$m) of inclusions.

According to these equations, the fatigue limit can be determined by the size of the inclusions and the hardness of the material. By the way, it is known that, in case where the carbon content is up to approx. 0.8, as the carbon content increases, the hardness of the material also increases.

Therefore, in case where the surfaces of the input disk, output disk and power rollers susceptible to contact stresses are carburized or carbonitrided to thereby increase the surface load carbon content and increase the material hardness, even when there is used medium-carbon steel containing large-sized inclusions, the fatigue limit can be enhanced, which makes it possible to obtain a toroidal-type continuously variable transmission having an extended life. Also, the present inventors have found that, in case where the core portion hardness of the material is set at HRC 35 or higher, the input disk, output disk and power rollers can be enhanced in rigidity to thereby enhance the bending fatigue strength thereof, which makes it possible to obtain a toroidal-type continuously variable transmission having an extended life.

Embodiment

Now, description will be given below of an embodiment of a toroidal-type continuously variable transmission according to the invention. By the way, the basic structure of a toroidal-type continuously variable transmission according to the invention is similar to the structure shown in FIG. 1, whereas at least one of the input disk, output disk and power rollers of the present toroidal-type continuously variable transmission are different in material from the conventional toroidal-type continuously variable transmission.

In the present embodiment, the input disk, output disk and power rollers are respectively manufactured using SCM 415, SCM 420, SCM 430, SCM 435, SCM 440, SCM 445, and a modified version of SCM 445 with its carbon content increased up to 0.6% (according to a JIS (Japanese Industry Standard)).

Of the thus manufactured bearing components, the input disks were respectively cut and ground and, after then, for the non-metallic inclusions of the input disks, the diameters of the maximum inclusions were assumed according to the extreme statistical method. Specifically, 30 pieces of samples were checked using an electronic microscope, and the maximum inclusions in an area of 100 mm$^2$ were measured in each sample; and, by measuring a total area of 3000 mm$^2$, the assumed inclusion diameters in an area of 3000000 mm$^2$ were found.

Figure 2:
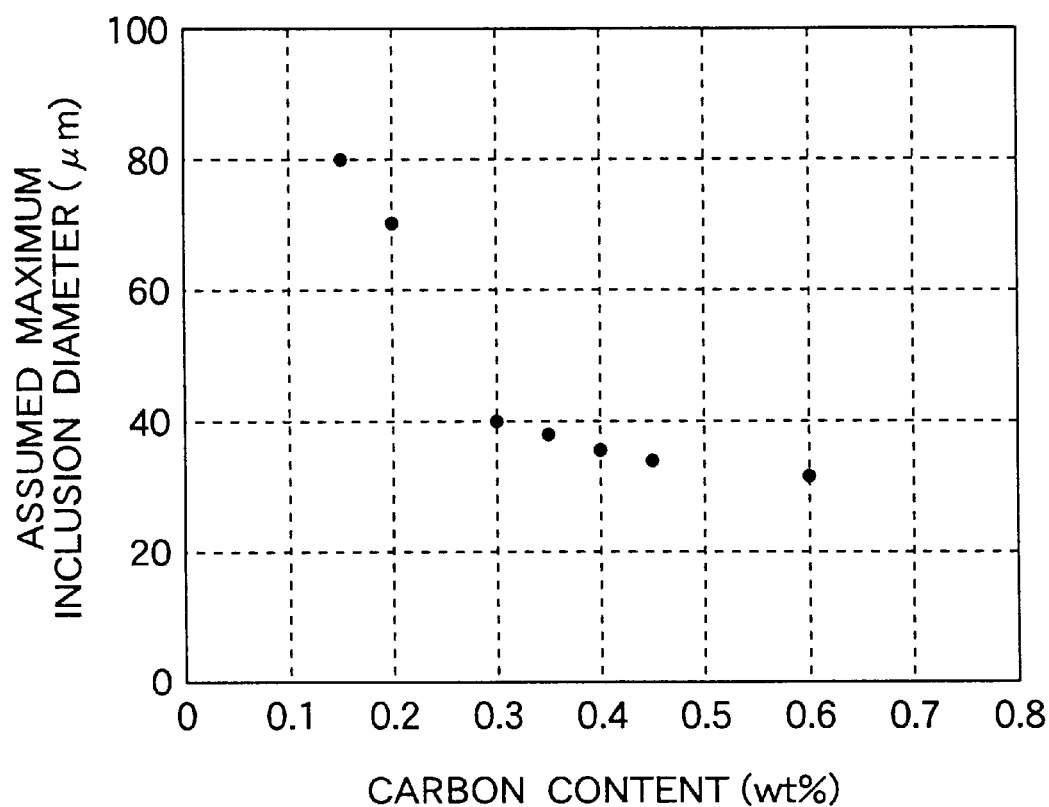
FIG. 2 is a characteristic view of the relation between the carbon contents in materials and the assumed maximum inclusion diameters found according to an extreme statistical method.

Now, FIG. 2 shows the carbon contents in the materials of the input disks and the assumed maximum inclusion diameters that are found according to the extreme statistical method. According to FIG. 2, it can be seen that, in case where the carbon content increases from 0.2 wt % to 0.3 wt %, the assumed maximum inclusion diameter decreases. That is, FIG. 2 shows that the assumed inclusion diameters in an area of 3000000 mm$^2$ may be preferably set at 40 $\mu$m or less because the carbon content is set at 0.3 wt % or more.

Next, using the above-manufactured input disks, output disks and power rollers, there was assembled CVTs (Continuously Variable Transmissions); and, a durability test was conducted on the CVTs within a test room. In this test, an input shaft was rotated using a dynamometer and a torque load was applied using the dynamometer that is mounted on an output shaft. And, the test was conducted under the following test conditions.

| Test Conditions | |
|---|---|
| Rotation speed | 3500 r.p.m |
| Output torque | 400 Nm |
| Lubrication | Traction oil |
| Oil temperature | 100° C. |

In this test, while monitoring the vibration value of the CVT unit, the test was continued until the vibration value reaches a preset level or higher. After the test was completed, the disks or power rollers were checked for their damaged states. The checked results are shown in the following tables 1 and 2.

TABLE 1

| | Material | Test Time | Damaged Portion | Damaged State | Start-Point Inclusion Diameter ($\mu$m) |
|---|---|---|---|---|---|
| Comparison 1 | SCM415 | 64 | Input disk | Broken | 68 |
| Comparison 2 | SCM415 | 58 | Output disk | Broken | 76 |
| Comparison 3 | SCM415 | 23 | Output disk | Broken | 78 |

TABLE 1-continued

| | Material | Test Time | Damaged Portion | Damaged State | Start-Point Inclusion Diameter (μm) |
|---|---|---|---|---|---|
| Comparison 4 | SCM415 | 80 | Power roller | Broken | 65 |
| Comparison 5 | SCM420 | 83 | Output disk | Broken | 64 |
| Comparison 6 | SCM420 | 67 | Output disk | Broken | 70 |
| Comparison 7 | SCM420 | 90 | Power roller | Broken | 62 |
| Comparison 8 | SCM420 | 101 | Input disk | Broken | 59 |

TABLE 2

| | Material | Test Time | Damaged Portion | Damaged State | Start-Point Inclusion Diameter (μm) |
|---|---|---|---|---|---|
| Embodiment 1 | SCM430 | 203 | Power roller | Peeled-off | Null |
| Embodiment 2 | SCM430 | 230 | Output disk | Peeled-off | Null |
| Embodiment 3 | SCM430 | 243 | Input disk | Peeled-off | Null |
| Embodiment 4 | SCM430 | 280 | Power roller | Peeled-off | Null |
| Embodiment 5 | SCM435 | 253 | Input disk | Peeled-off | Null |
| Embodiment 6 | SCM435 | 266 | Output disk | Peeled-off | Null |
| Embodiment 7 | SCM435 | 300 | Input disk | Peeled-off | Null |
| Embodiment 8 | SCM435 | 305 | Output disk | Peeled-off | Null |
| Embodiment 9 | SCM440 | 340 | Power roller | Peeled-off | Null |
| Embodiment 10 | SCM440 | 380 | Input disk | Peeled-off | Null |
| Embodiment 11 | SCM440 | 363 | Input disk | Peeled-off | Null |
| Embodiment 12 | SCM440 | 398 | Output disk | Peeled-off | Null |
| Embodiment 13 | SCM445 | 354 | Power roller | Peeled-off | Null |
| Embodiment 14 | SCM445 | 323 | Input disk | Peeled-off | Null |
| Embodiment 15 | SCM445 | 402 | Input disk | Peeled-off | Null |
| Embodiment 16 | SCM445 | 366 | Power roller | Peeled-off | Null |
| Embodiment 17 | SCM445 (C: 0.6%) | 423 | Output disk | Peeled-off | Null |
| Embodiment 18 | SCM445 (C: 0.6%) | 435 | Power roller | Peeled-off | Null |
| Embodiment 19 | SCM445 (C: 0.6%) | 462 | Power roller | Peeled-off | Null |
| Embodiment 20 | SCM445 (C: 0.6%) | 418 | Input disk | Peeled-off | Null |

In the case of the materials of SCM 414 and SCM 420, the damaged states thereof were all found broken. When the broken surfaces of the damaged products were observed, it was found that the start points of cracks were all the non-metallic inclusions in the materials. The non-metallic inclusions, which had provided the crack start points, were observed using a scan-type electronic microscope to thereby find their respective diameters. This microscopic observation shows that the diameters of the inclusions providing the crack start points are in the range of 59–78 μm. On the other hand, in the case of the materials of SCM 430, SCM 435, SCM 440, SCM 445 and a modified version of SCM 445 in which a carbon content thereof is increased up to 0.6%, the damaged states thereof were all found such that only the raceway surfaces thereof were peeled off; but, no inclusions were observed in the peeled-off portions of the materials.

Figure 3:
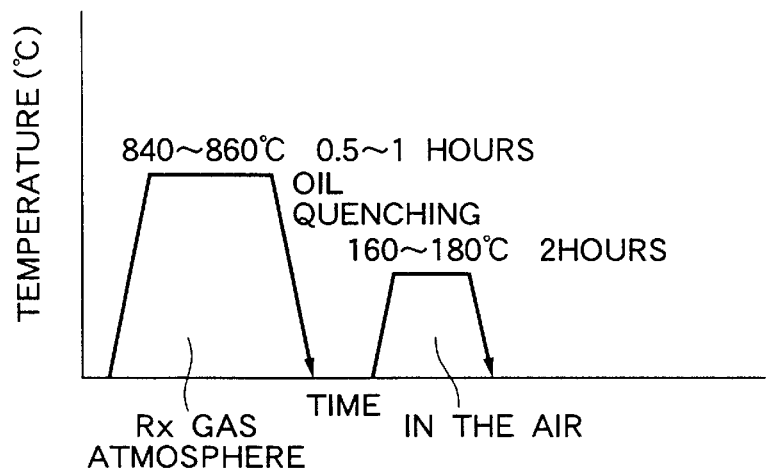
FIG. 3 is a characteristic view of an embodiment of a toroidal-type continuously variable transmission according to the invention, showing the relation between time and temperature under the hardening and quenching conditions according to Tables 1 and 2.
Figure 4:
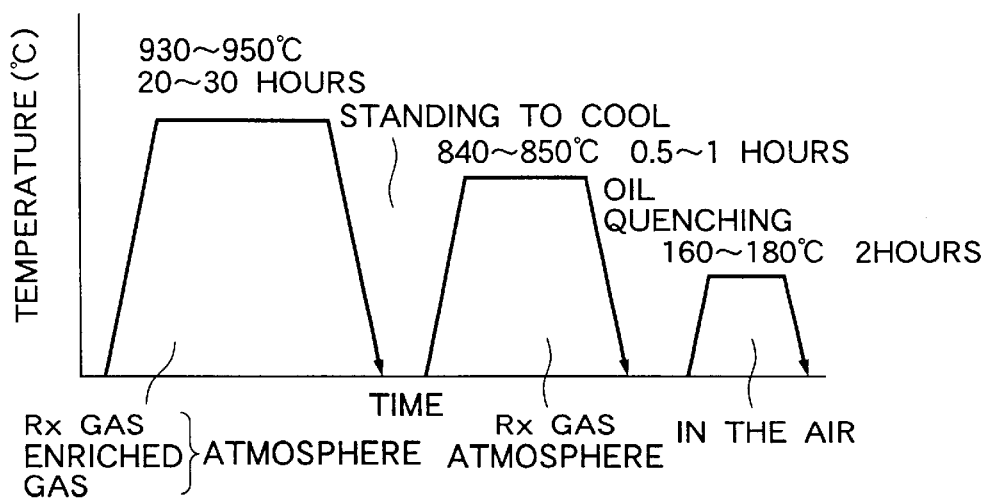
FIG. 4 is a characteristic view of an embodiment of a toroidal-type continuously variable transmission according to the invention, showing the relation between time and temperature under the carburizing, hardening and quenching (W quenching) conditions.
Figure 5:
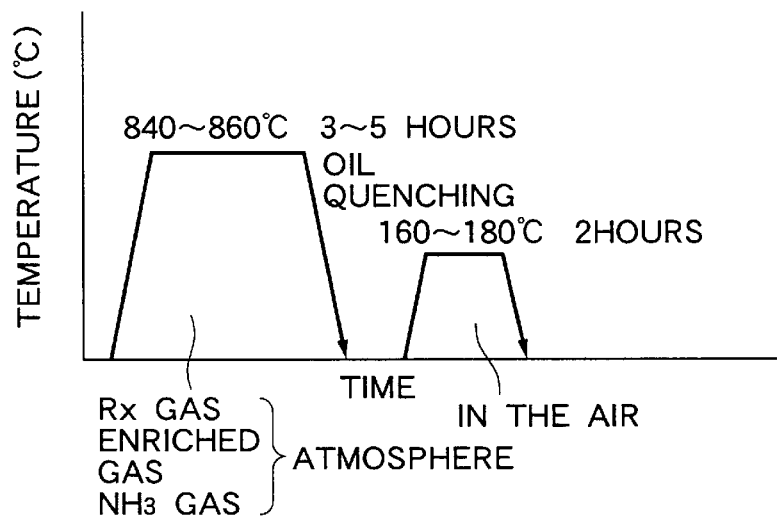
FIG. 5 is a characteristic view of an embodiment of a toroidal-type continuously variable transmission according to the invention, showing the relation between time and temperature under the carbonitriding, hardening and quenching conditions.
Figure 6:
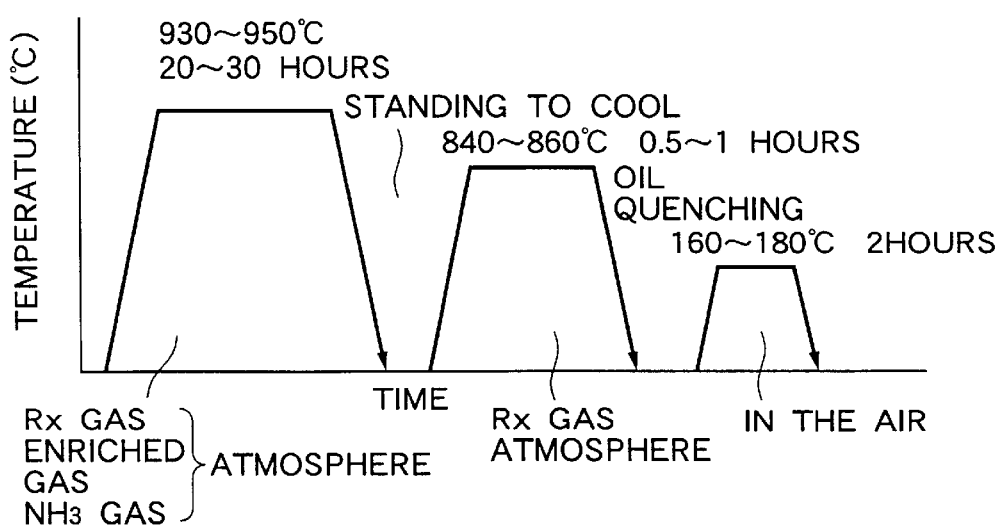
FIG. 6 is a characteristic view of an embodiment of a toroidal-type continuously variable transmission according to the invention, showing the relation between time and temperature under the carbonitriding, hardening and quenching (W quenching) conditions.

Next, the materials of SCM 415, SCM 420, SCM 430, SCM 435, SCM 440, SCM 445 and a modified version of SCM 445 with a carbon content increased up to 0.6% were respectively carburized or carbonitrided to manufacture input disks, output disks and power rollers respectively. Thermal treatments were carried out on them in such manners as shown in FIGS. 3–6. However, FIG. 3 is a characteristic view of the present embodiment, showing the relation between time and temperature under the hardening and quenching conditions according to Tables 1 and 2, FIG. 4 is a characteristic view of the present embodiment, showing the relation between time and temperature under the carburizing, hardening and quenching conditions, FIG. 5 is a characteristic view of the present embodiment, showing the relation between time and temperature under the carbonitriding, hardening and quenching conditions, and FIG. 6 is a characteristic view of the present embodiment, showing the relation between time and temperature under the carbonitriding, hardening and quenching conditions.

Using the thus manufactured input disks, output disks and power rollers, there were assembles CVTs, and a durability test was conducted on the CVTs within a test room. An input shaft was rotated using a dynamometer, while a torque load was applied using a dynamometer which is mounted on an output shaft. The durability test was carried out under the following test conditions.

| Test Conditions | |
|---|---|
| Rotation speed | 3500 r.p.m. |
| Output torque | 400 Nm |
| Lubrication | Traction oil |
| Oil temperature | 100° C. |

While monitoring the vibration values of the CVT units, the test was conducted until the vibration values reached a preset level or higher. Also, in the case of the CVT units in which vibration values did not rise, the test was discontinued. After the test was completed, the input disks, output disks and power rollers were checked for the damaged states thereof. The checked results are shown in the following tables 3 and 4.

TABLE 3

| | Material | Surface treatment | Test Time | Damaged Portion | Damaged State | Start-Point Inclusion Diameter (μm) |
|---|---|---|---|---|---|---|
| Comparison 9 | SCM415 | Carburizing | 77 | Output disk | Broken | 68 |
| Comparison 10 | SCM415 | Carburizing | 83 | Input disk | Broken | 77 |
| Comparison 11 | SCM415 | Carbonitriding | 93 | Power roller | Broken | 73 |
| Comparison 12 | SCM415 | Carbonitriding | 103 | Output disk | Broken | 65 |
| Comparison 13 | SCM420 | Carburizing | 67 | Output disk | Broken | 58 |

TABLE 3-continued

| | Material | Surface treatment | Test Time | Damaged Portion | Damaged State | Start-Point Inclusion Diameter ($\mu$m) |
|---|---|---|---|---|---|---|
| Comparison 14 | SCM420 | Carburizing | 90 | Output disk | Broken | 62 |
| Comparison 15 | SCM420 | Carbonitriding | 74 | Input disk | Broken | 69 |
| Comparison 16 | SCM420 | Carbonitriding | 120 | Power roller | Broken | 54 |

TABLE 4

| | Material | Surface treatment | Test Time | Damaged Portion | Damaged State | Start-Point Inclusion Diameter ($\mu$m) |
|---|---|---|---|---|---|---|
| Embodiment 21 | SCM430 | Carburizing | 800 | Null | | |
| Embodiment 22 | SCM430 | Carburizing | 800 | Null | | |
| Embodiment 23 | SCM430 | Carbonitriding | 800 | Null | | |
| Embodiment 24 | SCM430 | Carbonitriding | 598 | Power roller | Peeled-off | Null |
| Embodiment 25 | SCM435 | Carburizing | 569 | Input disk | Peeled-off | Null |
| Embodiment 26 | SCM435 | Carburizing | 800 | Null | | |
| Embodiment 27 | SCM435 | Carbonitriding | 800 | Null | | |
| Embodiment 28 | SCM435 | Carbonitriding | 800 | Null | | |
| Embodiment 29 | SCM440 | Carburizing | 800 | Null | | |
| Embodiment 30 | SCM440 | Carburizing | 688 | Output disk | Peeled-off | Null |
| Embodiment 31 | SCM440 | Carbonitriding | 800 | Null | | |
| Embodiment 32 | SCM440 | Carbonitriding | 800 | Null | | |
| Embodiment 33 | SCM445 | Carburizing | 800 | Null | | |
| Embodiment 34 | SCM445 | Carburizing | 800 | Null | | |
| Embodiment 35 | SCM445 | Carbonitriding | 800 | Null | | |
| Embodiment 36 | SCM445 | Carbonitriding | 800 | Null | | |
| Embodiment 37 | SCM445 (C: 0.6%) | Carburizing | 623 | Power roller | Peeled-off | Null |
| Embodiment 38 | SCM445 (C: 0.6%) | Carburizing | 800 | Null | | |
| Embodiment 39 | SCM445 (C: 0.6%) | Carbonitriding | 800 | Null | | |
| Embodiment 40 | SCM445 (C: 0.6%) | Carbonitriding | 800 | Null | | |

In the case of the materials of SCM 415 and SCM 420, the damaged states thereof were all found broken. When the broken surfaces of the damaged products were observed, it was found that the start points of cracks were all the non-metallic inclusions in the materials, while the diameters of the inclusions providing the crack start points were 54–77 $\mu$m. On the other hand, in the case of the materials of SCM 430, SCM 435, SCM 440, SCM 445 and a modified version of SCM 445 in which a carbon content thereof is increased up to 0.6%, the damaged states thereof were all found such that only the raceway surfaces thereof were peeled off; but, no inclusions were observed in the peeled-off portions of the materials.

Next, using the materials of SCM 430, SCM 440 and SCM 445, there were manufactured disks. After carburized or carbonitrided, the disks were hardened and quenched, and the thermal treatment was changed, that is, the thermal treatment was carried out in such a manner that the core portions of the disks could provide the hardness of HRC 30, 40, 45.

Figure 7:
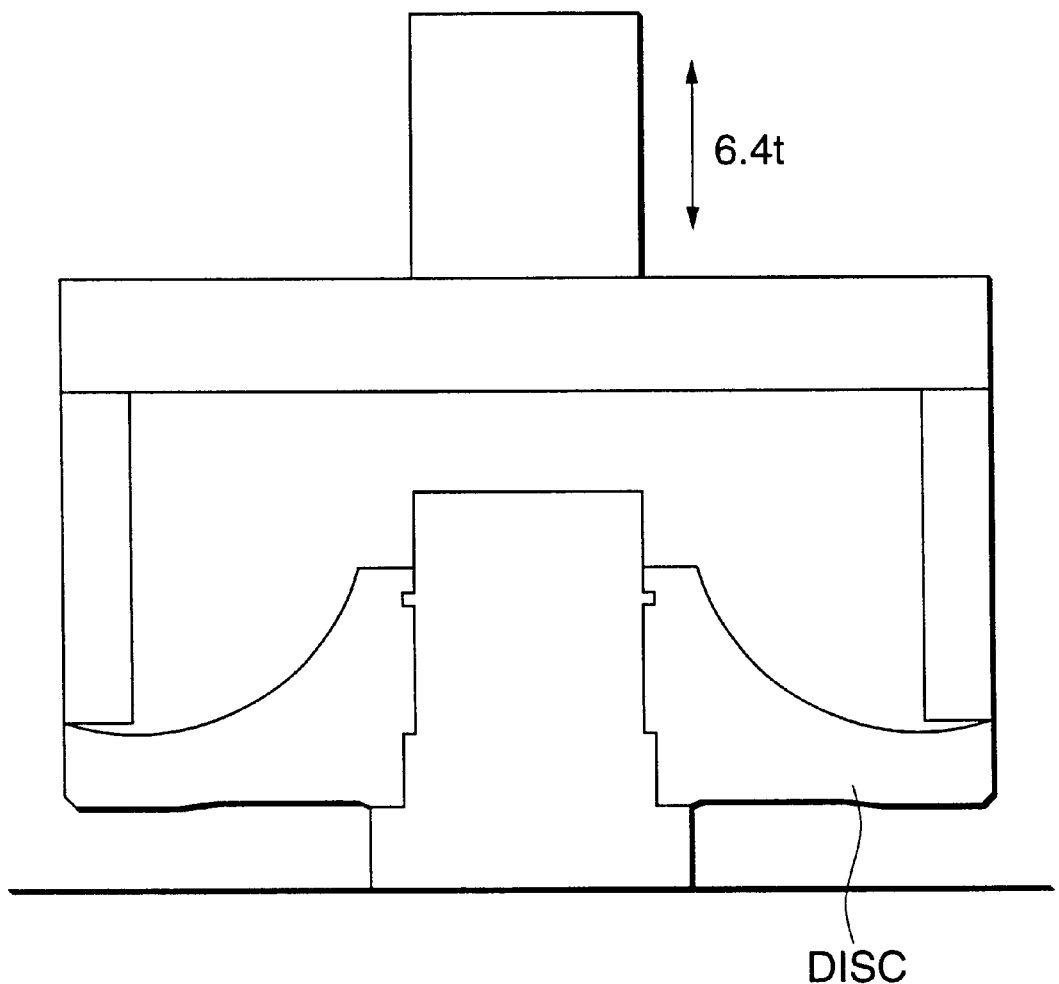
FIG. 7 is an explanatory view of a disk breakage test employed in the invention.

After then, a fatigue test was conducted on the disks. That is, as shown in FIG. 7, while loads were applied repetitively to the two points of the end faces of the raceway surface of each disk, the fatigue test was continued until the disk was broken. The test conditions are as follows:

| | |
|---|---|
| Testing machine | Servo-type fatigue testing machine |
| Control | Load control |
| Load applied | Up to 6.4 t (3.2 t per point) |
| Repetitive Speed | 30 Hz |

Figure 8:
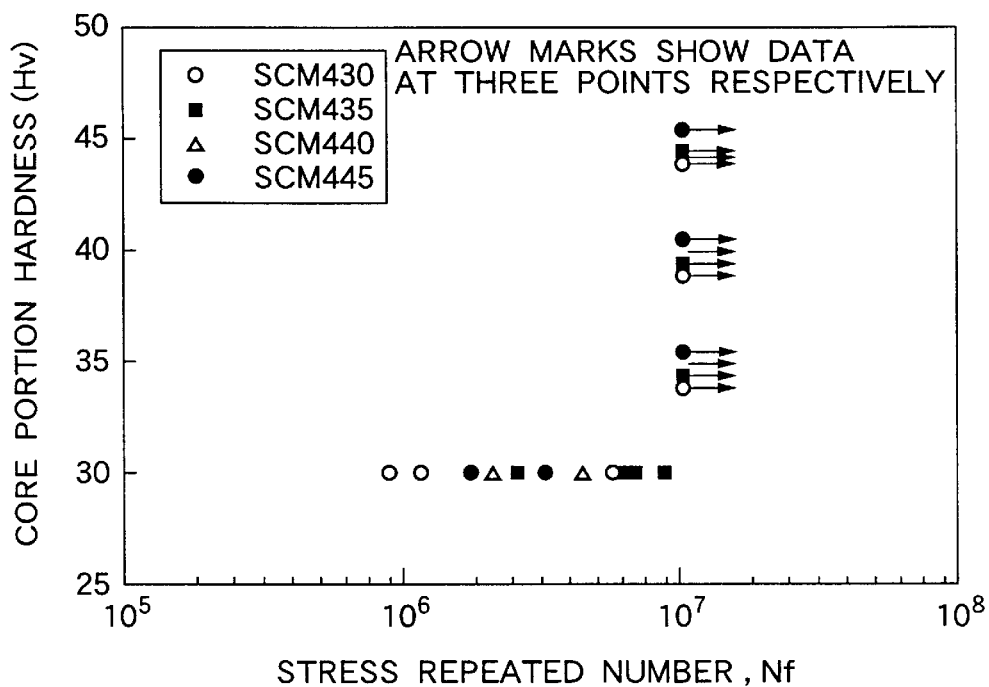
FIG. 8 is a characteristic view of the relation between the stress repeated number and the core portion hardness according to the disk breakage test (carburizing); and, FIG. 9 is a characteristic view of the relation between the stress repeated number and the core portion hardness according to the disk breakage test (carbonitriding).
Figure 9:
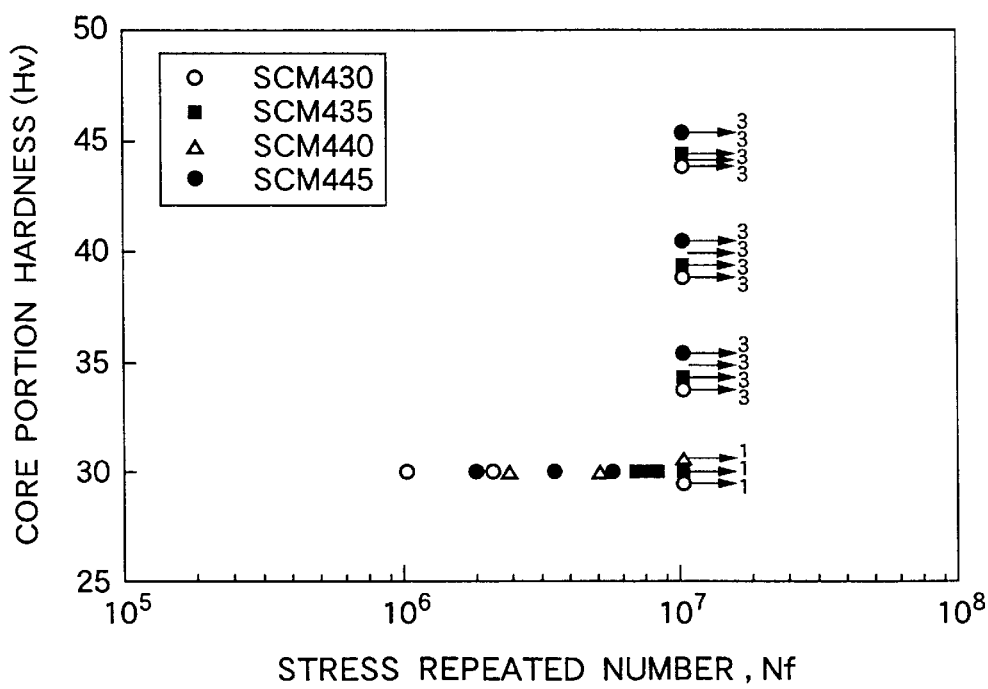

The test results are shown in FIGS. 8 and 9. Here, FIG. 8 shows the disk breakage test results (carburizing) and, in FIG. 8, the horizontal axis represents the stress repeated number (Nf) and the vertical axis represents the core portion hardness (Hv) Also, FIG. 9 shows the disk breakage test results (carbonitriding) and, in FIG. 9, the horizontal axis represents the stress repeated number (Nf) and the vertical axis represents the core portion hardness (Hv). These results show that, in case where the core portion hardness is HRC 35 or higher, the disk cannot be broken at $10^7$ cycles.

As has been described heretofore, according to the invention, even in the input disks, output disks and power roller bearings to which there are applied high contact pressure and high bending stress at the same time, it is possible to provide a toroidal-type continuously variable transmission which can enjoy a very long life.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A toroidal-type continuously variable transmission, comprising:

an input disk and an output disk disposed coaxially so as to be opposed to each other; and a pair of power roller bearings, each power roller bearing including an inner race, an outer race and a plurality of rolling elements disposed so as to roll on the toroidal surfaces of said input and output disks, wherein at least one of said input disk, said output disk, said inner race and said outer race is made of medium-carbon steel containing carbon in an amount ranging from 0.3 wt % to 0.5 wt %, and further wherein assumed maximum non-metallic inclusion diameters of said medium-carbon steel in an area of 3000000 mm$^2$ are at 40 $\mu$m or less, wherein said assumed maximum inclusion diameters are determined by an extreme statistical method which is carried out by checking 30 pieces of its samples while using a microscope, measuring the maximum inclusions in an area of 100 mm² in each samples, and finding the assumed inclusion diameters in an area of 3000000 mm² through the measurement of a total area of 3000 mm².

2. The toroidal-type continuously variable transmission according to claim 1, wherein said at least one of said input disk, said output disk, said inner race and said outer race has a surface layer which is carburized or carbonitrided.

3. A toroidal-type continuously variable transmission according to claim 1, wherein said at least one of said input disk, said output disk, said inner race and said outer race has a surface layer which is carburized or carbonitrided and further hardened and tempered in such a manner that a core portion has a hardness of HRC 35 or higher.

4. A toroidal-type continuously variable transmission according to claim 1, wherein said medium-carbon steel is selected from the group consisting of SCM 415, SCM 420, SCM 430, SCM 435, SCM 440, SCM 445, and a modified version of SCM 445 with its carbon content increased up to 0.6%.

* * * * *